(12) United States Patent
Limroth (10) Patent No.: US 6,317,637 B1
(45) Date of Patent: Nov. 13, 2001

(54) SYSTEM AND METHOD FOR MAINTAINING OUTPUT CONTINUITY OF PID CONTROLLERS IN RESPONSE TO CHANGES IN CONTROLLER PARAMETERS

(75) Inventor: John Limroth, Austin, TX (US)

(73) Assignee: National Instruments Corporation, Austin, TX (US)

( * ) Notice: Subject to any disclaimer, the term of this patent is extended or adjusted under 35 U.S.C. 154(b) by 0 days.

(21) Appl. No.: 09/177,210

(22) Filed: Oct. 22, 1998

(51) Int. Cl.[7] .................................................. G05B 13/02
(52) U.S. Cl. .............................. 700/42; 700/37; 700/45; 706/900
(58) Field of Search .................................. 700/28, 37, 42, 700/50, 40, 41, 43, 45; 607/102; 706/900

(56) References Cited

U.S. PATENT DOCUMENTS

| | | | |
|---|---|---|---|
| 5,043,862 | * | 8/1991 | Takahashi et al. ...................... 700/42 |
| 5,153,807 | * | 10/1992 | Saito et al. .............................. 700/45 |
| 5,490,058 | * | 2/1996 | Yamasaki et al. ....................... 700/40 |
| 5,568,377 | * | 10/1996 | Seem et al. .............................. 700/37 |
| 5,587,896 | * | 12/1996 | Hansen et al. .......................... 700/28 |
| 5,748,467 | * | 5/1998 | Qin et al. ................................ 700/50 |
| 5,867,384 | * | 2/1999 | Drees et al. ............................. 700/42 |
| 5,971,579 | * | 10/1999 | Kim ........................................ 700/42 |
| 5,974,434 | * | 10/1999 | Rose ..................................... 607/102 |
| 6,055,459 | * | 4/2000 | Lawrence ............................... 700/42 |

* cited by examiner

Primary Examiner—William Grant
Assistant Examiner—Ronald D Hartman, Jr.
(74) Attorney, Agent, or Firm—Conley, Rose & Tayon PC; Jeffrey C. Hood (57) ABSTRACT

A PID control system and method which maintains continuity of the control output in spite of changes in controller parameters. The controller parameters include a proportional gain, an integral gain, a derivative gain, and a manual/automatic mode parameter. The control output at the time of a parameter change is set equal to the previous controller output, and the integrated error is set to a value consistent with the previous controller output according to a PID controller equation. This value for the integrated error serves to ensure the sustained continuity of the control output after the controller parameter change. Alternatively, the control output at the time of a parameter change is set equal to a first value continuous with respect to one or more previous control output values, and the integrated error is set to a value consistent with the first value according to the PID controller equation. Furthermore, the system and method employs integrator anti-windup. If the control output saturates, i.e. falls outside a control region defined by a lower control bound and an upper control bound, the system and method of the present invention prescribe (a) setting the control output to the value of the control bound which is exceeded, and (b) setting the integrated error equal to a value consistent with the exceeded control bound according to the PD controller equation.

54 Claims, 7 Drawing Sheets

PID Controller System of the Present Invention

Figure 1: Prior Art PID-Based Control System

Figure 2: PID Controller System of the Present Invention

Figure 3: Control Algorithm

Figure 4: PID Control Algorithm

SYSTEM AND METHOD FOR MAINTAINING OUTPUT CONTINUITY OF PID CONTROLLERS IN RESPONSE TO CHANGES IN CONTROLLER PARAMETERS

FIELD OF THE INVENTION

The present invention relates to the field of automatic control, and in particular a system and method for enhancing the performance of Proportional-Integral-Derivative (PID) controllers.

DESCRIPTION OF THE RELATED ART

The field of automatic control has proliferated in recent years. In response to advances in processor and memory technology, control algorithms are increasingly being implemented in software with the attendant benefits of increased flexibility and performance. Although the science of automatic control offers a wide spectrum of choices for control algorithms, the majority of industrial controllers in existence today are implemented according to the Proportional-Integral-Derivative (PID) algorithm. PID controllers became commercially available as early as the 1930s, and have been realized in various technologies including pneumatics, mechanics, and electronics [Process Dynamics and Control, Dale E. Seborg et al., ISBN 0-471-86389-0, 1989, page184]. The principles and operation of PID controllers are well-understood in the engineering community. Thus, manufacturers of control products have a strong incentive for providing products based on the PID algorithm.

Figure 1:
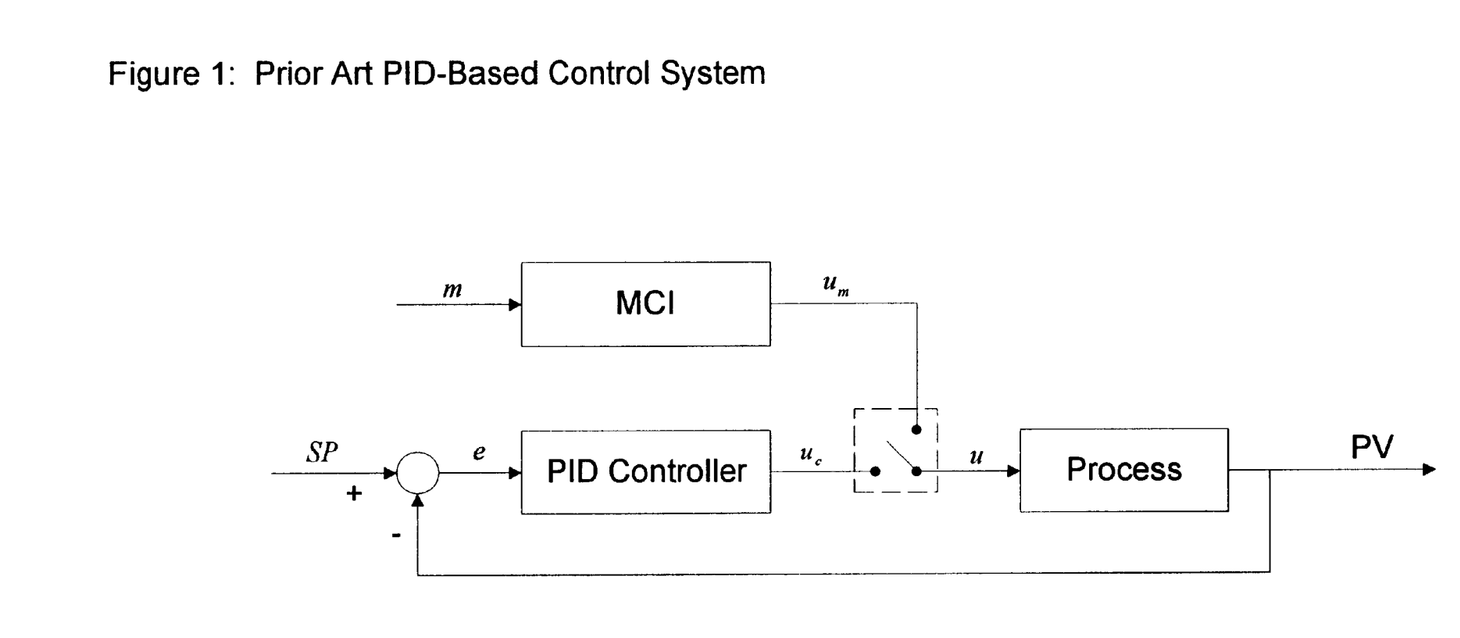
FIG. 1 illustrates a control system according to the prior art.

FIG. 1 illustrates the structure of a PID-based control system which is well known in the prior art. The control system includes a PID controller and a process which is to be controlled. A process variable PV associated with the process is measured and compared to a set point value SP. An error signal e is computed as the difference of the set point and the process value, i.e.

$$e(t)=SP(t)-PV(t) \quad (1)$$

The error signal e is supplied as the input to the PID controller. The PID controller generates a control signal $u_c$ according to the relation $$u_c(t) = K_P\left[e(t) + \frac{1}{T_I}\int_0^t e(\tau)d\tau + T_D \dot{e}(t)\right], \quad (2)$$

which involves terms proportional to the error, the integral of the error, and the derivative of the error. The gain parameters $K_P$, $T_I$, and $T_D$ determine the behavior of the PID controller.

The control system of FIG. 1 is configured to operate in an automatic control mode and a manual control mode. A switch is included to represent the choice of mode, although in practice the function of the switch may be implemented in software. In the automatic mode, the switch is disposed to couple the PID controller output $u_c$ to the process input u. In the manual mode, the switch is disposed to couple the output $u_m$ of the manual control interface (MCI) to the process input. The manual control interface receives a manual input m directly from the system user and converts the manual input into a manual control signal $u_m$. The manual control interface allows the system user to directly control the dynamics of the process.

Modern PID controllers are typically implemented in software or digital hardware. Thus, the controller output $u_c$ is quite often computed according to the discrete-time relations $$u_c(k) = K_P\left[e_k + \frac{\Delta t}{T_I}\sum_{j=0}^{k}\left(\frac{e_j + e_{j-1}}{2}\right) - T_D\frac{e_k - e_{k-1}}{\Delta t}\right], \quad (4)$$

where k is a discrete time index, $\Delta t$ is the sample interval, $SP_k$ is current value of the set point, and $PV_k$ is the current value of the process variable. Equation (4) is sometimes referred to as the positional PID equation since it specifies the position of the variable $u_c$. A PID algorithm based on equation (4) is thus referred to as a positional algorithm. A positional PID algorithm generally includes a storage location for the integrated error $$IE_k = \sum_{j=0}^{k}\left(\frac{e_j + e_{j-1}}{2}\right)\Delta t. \quad (5)$$

In terms of the integrated error, the controller output may be expressed as $$u_c(k) = K_P\left[e_k + \frac{1}{T_I}IE_k - T_D\frac{e_k - e_{k-1}}{\Delta t}\right]. \quad (6)$$

Prior to the computation of the controller output $u_c(k)$, the integrated error is updated with the current error data as follows:

$$IE_k = IE_{k-1} + \frac{e_k + e_{k-1}}{2}\Delta t. \quad (7)$$

The set point SP, and the control parameters $K_P$, $T_I$ and $T_D$ are controlled by the user. For example, a software based PID controller may provide a graphical user interface to facilitate user control of the set point, the control parameters, the manual/automatic mode switch, and manual input m.

One fundamental disadvantage associated with prior art positional PID algorithms is their tendency to produce large control discontinuities in response to parameter changes. For example, a change in the proportional gain KP will generally produce an abrupt change in the control output $u_c$ as may be observed by the magnitude of the partial derivative of the control output with respect to the proportional gain $K_P$:

$$\left.\frac{\partial[u_c(k)]}{\partial K_P}\right|_{pos} = e_k + \frac{\Delta t}{T_I}\sum_{j=0}^{k}\left(\frac{e_j + e_{j-1}}{2}\right) - T_D\frac{e_k - e_{k-1}}{\Delta t}. \quad (8)$$

These discontinuities in controller output due to parameter changes especially affect the behavior of gain scheduling PID controllers. Gain scheduling is characterized by using different sets of gains ($K_P$, $T_I$, $T_D$) for different regions of operation of the controller. Often the gains are "scheduled" according the value of a variable such as the set point or process variable. For example, a gain schedule is illustrated by the following set of rules which control the gains to be used based on the value of the set point SP:

If $0 \leq SP \leq 30$, use $K_P=1, T_I=0.1, T_D=0.04$;

If $30 < SP \leq 70$, use $K_P=2, T_I=0.06, T_D=0.04$;

If $70 < SP \leq 100$, use $K_P=4, T_I=0.02, T_D=0.04$.

Thus, the positional controller output exhibits a sudden discontinuity whenever the set point (i.e. scheduling parameter) migrates from one region to another.

PID algorithms which are less sensitive to control parameter changes may be obtained from an incremental form for the controller output as follows. Controller equation (4) holds for all values of the discrete index k. In particular, equation (4) implies that the previous controller output $$u_c(k-1) = K_P\left[e_{k-1} + \frac{\Delta t}{T_I}\sum_{j=0}^{k}\left(\frac{e_j + e_{j-1}}{2}\right) - T_D\frac{e_{k-1} - e_{k-2}}{\Delta t}\right]. \quad (9)$$

Taking the difference of equation (4) and equation (9), one obtains the so called incremental PID equation:

$$\Delta u_c(k) = K_P\left[(e_k - e_{k-1}) + \frac{\Delta t}{T_I}\left(\frac{e_k + e_{k-1}}{2}\right) - T_D\frac{e_k - 2e_{k-1} + e_{k-2}}{\Delta t}\right], \quad (10)$$

where the control increment $\Delta u_c(k)$ is the difference between the current controller output and the previous controller output, i.e. $\Delta u_c(k) = u_c(k) - u_c(k-1)$. Observe that the control increment $\Delta u_c(k)$ is computed in terms of the current error $e_k$ and the two previous error values $e_{k-1}$ and $e_{k-2}$. Using the incremental PID equation (10), the current control output $u_c(k)$ may be written in a recursive form as follows:

$$u_c(k) = \quad (11)$$
$$u_c(k-1) + K_P\left[(e_k - e_{k-1}) + \frac{\Delta t}{T_I}\left(\frac{e_k + e_{k-1}}{2}\right) - T_D\frac{e_k - 2e_{k-1} + e_{k-2}}{\Delta t}\right].$$

A PID algorithm based on equation (10), or equivalently equation (11), is referred to as an incremental PID algorithm.

One disadvantage of the incremental algorithm is that it gives an incorrect response to changes in the controller parameters. For a Proportional or Proportional-Derivative controller (i.e. no integral action), the incremental algorithm will generate a control output which is obviously inconsistent with the positional algorithm. For example, consider a Proportional controller with output given by $u=K_p e$. When the gain $K_p$ is changed, the subsequent incremental controller output, determined by the equation $$u(k)=u(k-1)+K_p(e_k-e_{k-1}),$$

changes only if the error e changes. If the process had achieved a steady state prior to the parameter change, the error increment at the moment of the parameter change is zero. Thus, the incremental controller output at the moment of the parameter change maintains its previous steady state value. This implies that the controller output is never perturbed from its original steady state value. In other words, the change in gain has no effect on a steady state system under proportional control with the incremental algorithm. The intent of the person (or agent) in changing the gain is defeated. In contrast, the positional algorithm for the same proportional controller will exhibit an discontinuity in the controller output at the moment of the gain change. Although the control output discontinuity is not desirable, it is to be preferred over the incorrect response exhibited by the incremental controller in the steady state case.

As mentioned above, an incremental PID algorithm exhibits smaller changes in control output in response to control parameter changes. For example, the sensitivity of the incremental algorithm control output $u_c$ with respect to changes in the proportional gain is specified by the partial derivative of equation (11) with respect to the proportional gain $K_p$:

$$\left.\frac{\partial[u_c(k)]}{\partial K_P}\right|_{inc} = (e_k - e_{k-1}) + \frac{\Delta t}{T_I}\left(\frac{e_k + e_{k-1}}{2}\right) - T_D\frac{e_k - 2e_{k-1} + e_{k-2}}{\Delta t}. \quad (12)$$

A cursory comparison of equation (12) with the sensitivity of the positional algorithm given by equation (8) reveals that the second term of (12) is in general significantly smaller than the second term of (8), i.e.

$$\frac{e_k + e_{k-1}}{2} \ll \sum_{j=0}^{k}\left(\frac{e_j + e_{j-1}}{2}\right). \quad (13)$$

Furthermore, the third term of (12) which approximates the second derivative of the error signal is generally smaller than the third term of (8) which approximates the first derivative of the error signal. Likewise, the first term of (12) which approximates the first derivative of the error signal is generally smaller than the first term of (8) which equals the error signal itself. Thus, the change in control output in response to changes in the proportional gain is significantly smaller on average for the incremental algorithm than for the positional algorithm.

Another advantage of the incremental algorithm is that when control is switched from manual mode to automatic mode, the controller output $u_c$ will maintain continuity with the manual control output $u_m$ at the time of the transition. This is because the output of the incremental controller is always a small incremental change from the previous controller output. At the time of the manual to automatic mode transition, the previous controller output $u_c(k-1)$ is taken to be the last manual control output value $u_m(k-1)$ prior to the transition.

In contrast, the positional PID controller, when switched from manual mode to automatic mode, produces a sudden jump in the control signal u since the controller output value $u_c(k)$ calculated on the basis of equation (4) bears no relation to the previous manual control output $u_m(k-1)$.

In addition to its beneficial behavior in response to mode transitions, one primary advantage of the incremental PID algorithm over the positional algorithm is that integrator anti-windup is very easily incorporated into the structure of the incremental algorithm. Suppose the controller output $u_c$ is limited to the range $u_{min}$ to $u_{max}$. When the control output saturates, i.e. attains one of the limiting values $u_{min}$ or $u_{max}$ any additional contributions to the controller output from the integral action are suppressed. The integrator anti-windup must be accomplished explicitly in the positional algorithm since the integrated error $IE_k$ is calculated in each iteration.

In spite of the advantages inherent in the incremental PID algorithm, the vast number of positional PID controllers extant in industry and the consequent ideological commitment of the engineering community to the positional paradigm underscores the need for a positional PID controller which emulates the advantages of incremental controllers. In particular, there exists a substantial need for a positional controller which would provide (a) bumpless (i.e. continuous) control output in response to parameters changes and transitions from manual to automatic control mode, and (b) natural and efficient integrator anti-windup calculation.

SUMMARY OF THE INVENTION

The present invention comprises a PID control system and method which largely resolves the problems associated with prior art PID controllers discussed above. The PID control system and method of the present invention advantageously maintains continuity of the control output in spite of changes in controller parameters. The controller parameters include a proportional gain, an integral gain, a derivative gain, and a manual/automatic mode parameter. The control output at the time of a parameter change is set equal to the previous controller output, and the integrated error is set to a value consistent with the previous controller output according to the fundamental PID controller equation. In other words, the integrated error is computed according to the relation $$IE = \frac{u_{prev} - u_P - u_D}{K_I},$$

where IE is the integrated error, $u_{prev}$ is the previous controller output, $u_P$ and $u_D$ are the proportional and derivative control terms respectively, and $K_I$ is the integral gain. This value for the integrated error serves to ensure the sustained continuity of the control output after the controller parameter change.

In the preferred embodiment, the PID control algorithm of the present invention is realized in software which executes on a computer system. The software may be stored on any of a variety of memory media. In an alternative embodiment, the PID control algorithm may implemented in reconfigurable logic, e.g., an FPGA, or in dedicated hardware. For example, a network of analog and/or digital devices such as adders, comparators, multipliers, etc. may be configured to perform the computation of the current control output value and integrated error.

In one embodiment of the PID control algorithm, the current control output value is set to a value which is continuous with respect to one or more previous control output values in response to a control parameter change. The current control output value may be linearly or non-linearly extrapolated from a plurality of previous control output values, thus providing for higher order continuity of the control output value at the time of a control parameter change. Furthermore, the integrated error may be set to a value which is consistent with the current control output value according to the PID controller equation. Namely, the integrated error may be assigned the value $$IE = \frac{u_c(k) - u_P - u_D}{K_I},$$

where $u_c(k)$ is the current control output value which has been previously assigned a value continuous with respect to previous control output values. This choice for the integrated error provides for the sustained continuity of the control output value after the parameter change.

Furthermore, the system and method of the present invention employs integrator anti-windup. If the control output saturates, i.e. falls outside a control region defined by a lower control bound and an upper control bound, the system and method of the present invention prescribe (a) setting the control output to the value of the control bound which is exceeded, and (b) setting the integrated error equal to a value consistent with the exceeded control bound according to the PID controller equation. For example, if the upper control bound is exceeded, then the integrated error is assigned the value $$IE = \frac{u_{max} - u_P - u_D}{K_I}.$$

The formulas used to set the integrated error during control saturation are advantageously similar to the formula used to set the integrated error in response to controller parameter changes. This uniformity in computational form may allow a PID algorithm according to the present invention to achieve a more efficient and compact code realization.

The present invention thus comprises a positional PID controller system and method which emulates the advantages of incremental controllers, including maintenance of continuity of the control output during changes in controller parameters and efficient implementation of integrator anti-windup.

BRIEF DESCRIPTION OF THE DRAWINGS

A better understanding of the present invention can be obtained when the following detailed description is considered in conjunction with the following drawings, in which.

While the invention is susceptible to various modifications and alternative forms, specific embodiments are shown by way of example in the drawings and will herein be described in detail. It should be understood however, that drawings and detailed descriptions thereto are not intended to limit the invention to the particular forms disclosed. But on the contrary the invention is to cover all modifications, equivalents and alternatives following within the spirit and scope of the present invention as defined by the appended claims.

DETAILED DESCRIPTION OF THE PREFERRED EMBODIMENT

Figure 2:
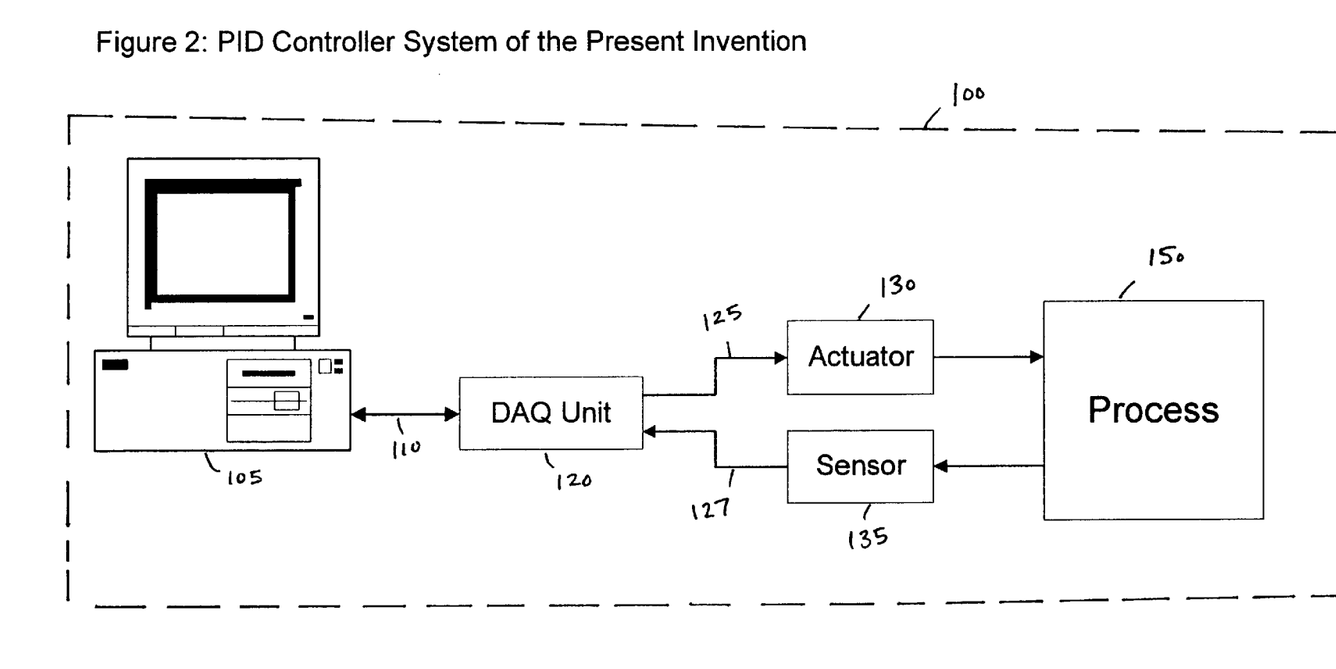
FIG. 2 illustrates a PID controller system of the present invention.

FIG. 2—Computer Based Control System

FIG. 2 illustrates a computer-based control system 100 according to the present invention. The present invention is described with respect to the computer-based control system. However, it is noted that the present invention may be implemented in any of various types of PID systems.

Computer-based control system 100 includes computer 105, Data Acquisition (DAQ) unit 120, actuator 130, sensor 135, and process 150. Computer 150 may be realized by any of a variety of computing devices, including general purpose computers or special purpose hardware. Computer 150 preferably includes various standard components, including a CPU, memory, a user input device such as a mouse or keyboard, non-volatile memory, and a display. Computer 150 communicates with DAQ unit 120 through computer bus 110.

DAQ unit 120 may be a data acquisition board comprised in the computer 105, or may be an external DAQ device, e.g. a PC card form factor, or a serial bus-based DAQ device. DAQ unit 120 is coupled to actuator 130 through command signal bus 125, and further coupled to sensor 135 through sensor signal bus 127. Actuator 130 provides a physical input (e.g. heat, reactant flowrate, etc.) to process 150 in response to the signal provided on command signal bus 125. Sensor 135 measures a physical quantity (e.g. temperature, pressure, etc.) associated with the process 150. Process 150 is illustrative of any of a variety of physical processes.

Computer 150 preferably executes a software based control algorithm according to the present invention. The software based control algorithm is preferably stored in a memory media of the computer 105. The term "memory media" includes one or more of an installation media, a non-volatile memory, or a system memory or volatile memory. Examples of installation media include a CD-ROM, floppy disk, zip drive, etc.. Examples of non-volatile memory include a magnetic media, e.g., a hard drive, or optical storage. Examples of system memory include DRAM (dynamic RAM), SRAM, EDO RAM, etc. The software based control algorithm is typically stored in a non-volatile memory such as the computer hard drive, and transferred to system memory at execution time. Under the control of the software based control algorithm, computer 105 supplies a command data signal to DAQ unit 120 through computer bus 110. The command data signal corresponds to the signal u of FIG. 1. The software based control algorithm may be executed by a CPU in the computer system 105 or by a processor comprised in the DAQ unit 120. In addition, the control algorithm may be executed by a reconfigurable processor, e.g., an FPGA, comprised in the DAQ unit 120. The control algorithm may also be executed in hardware. The control algorithm may be executed in various other ways as desired.

It is noted that DAQ unit 120 may be a data acquisition board configured for insertion into a slot of computer 105. In this case, computer bus 110 may coincide with the system bus of computer 105. In an alternate embodiment of computer based control system 100, DAQ unit 120 resides external to computer 105.

DAQ unit 120 drives command signal bus 125 with an actuating signal which corresponds to the command data signal supplied by computer 105. DAQ unit 120 typically includes digital-to-analog (D/A) conversion circuitry to transform the command data signal into an analog actuating signal. Alternatively, actuator 130 may include its own D/A conversion circuitry. In this case, the DAQ unit 120 may pass the command data signal to directly to actuator 130.

Actuator 130 transforms the actuating signal supplied on command signal bus 125 into a physical input to process 150. For example, actuator 130 may be a heating device which applies heat to process 150 at a rate determined by the magnitude of the actuating signal. The physical input induces a change in state of the process 150.

Sensor 135 measures a physical variable associated with the process (i.e. the process variable PV of FIG. 1), and drives sensor signal bus 127 with a measurement signal which corresponds to the value of the physical variable. For example, sensor 135 may be a temperature sensing device which drives sensor signal bus 127 with a voltage signal which reflects the instantaneous process temperature.

It is noted that sensor 135 may be configured to sense a digital process variable in a digitally oriented process. For example, sensor 135 may generate a digital value representative of the frequency of a TTL pulse train. Similarly, actuator 130 may be configured to generate a digital signal for a digitally oriented process. In the example just given, actuator 130 may be configured to generate a pulse train with a variable duty cycle (pulse-width modulated) depending upon the actuating signal.

DAQ unit 120 receives the measurement signal, converts the measurement signal into a digital measurement signal, and sends the digital measurement signal to computer 105 through computer bus 110. DAQ unit 120 includes analog-to-digital (A/D) conversion circuitry to convert the measurement signal into digital form. Alternatively, sensor 135 may include its own A/D conversion circuitry. In this case, A/D conversion in DAQ unit 120 may not be necessary.

Figure 3:
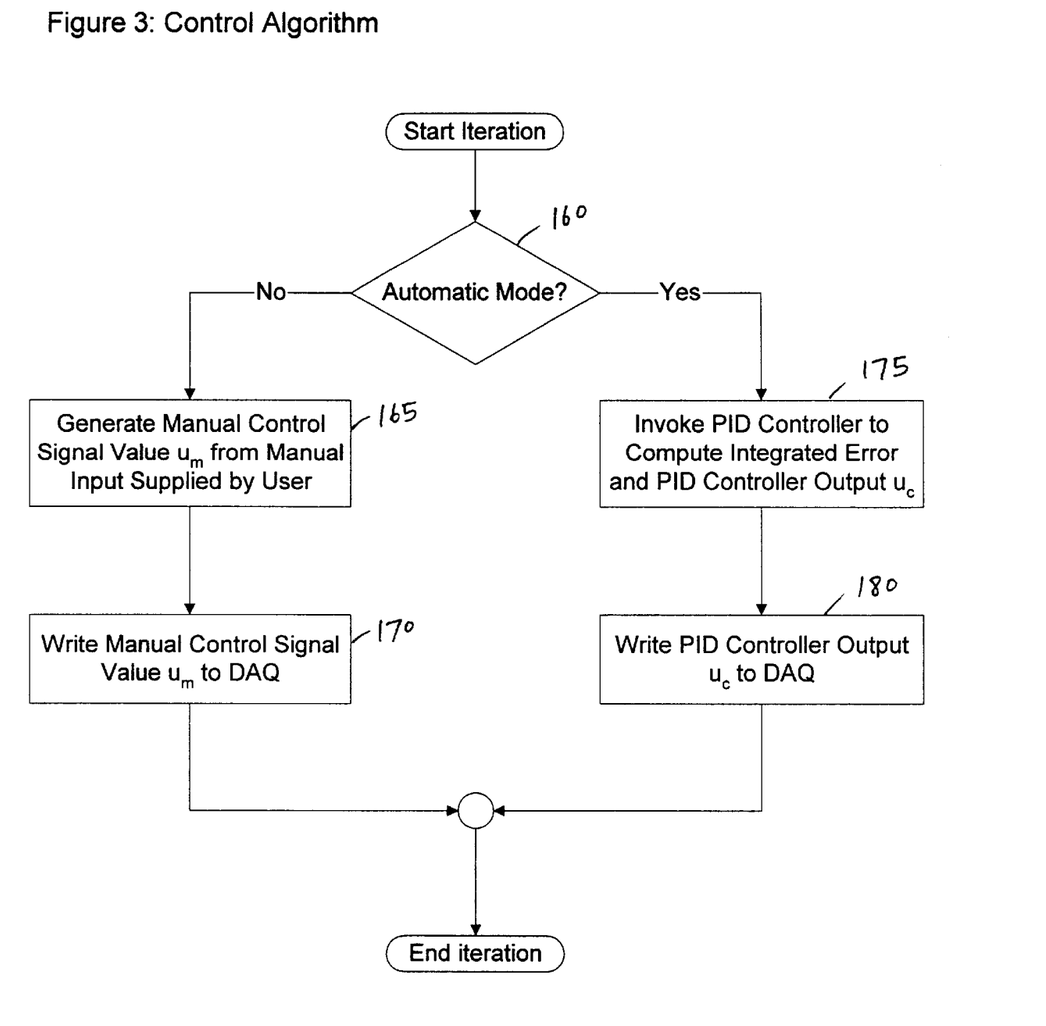
FIG. 3 illustrates a control algorithm according to the present invention.

FIG. 3—Control Algorithm Flowchart

FIG. 3 illustrates a flowchart of the control algorithm of the preferred embodiment of the present invention. The flowchart of FIG. 3 is traversed iteratively at a rate determined by the sample interval $\Delta t$. At the start of an iteration, the control algorithm determines whether the mode control parameter MA is set to automatic mode as shown in step 160. If the mode control parameter is set to automatic mode, steps 175 and 180 are performed. Otherwise, i.e. if the mode control parameter is set to manual mode, steps 165 and 170 are performed.

If the mode control parameter is set to automatic mode, in step 175 the control algorithm invokes the PID controller to compute the integrated error IE and the PID controller output $u_c(k)$ according to the present invention. Step 175 will be explained in greater detail below. In step 180 the control algorithm writes the PID controller output $u_c(k)$ to the DAQ unit 120 for output to process 150.

If the mode control parameter is set to manual mode, then in step 165 the control algorithm generates a manual control signal value $u_m$ from the manual input m supplied by the user. In step 170 the control algorithm writes the manual control signal value $u_m$ to DAQ unit 120 for output to process 150.

Figure 4:
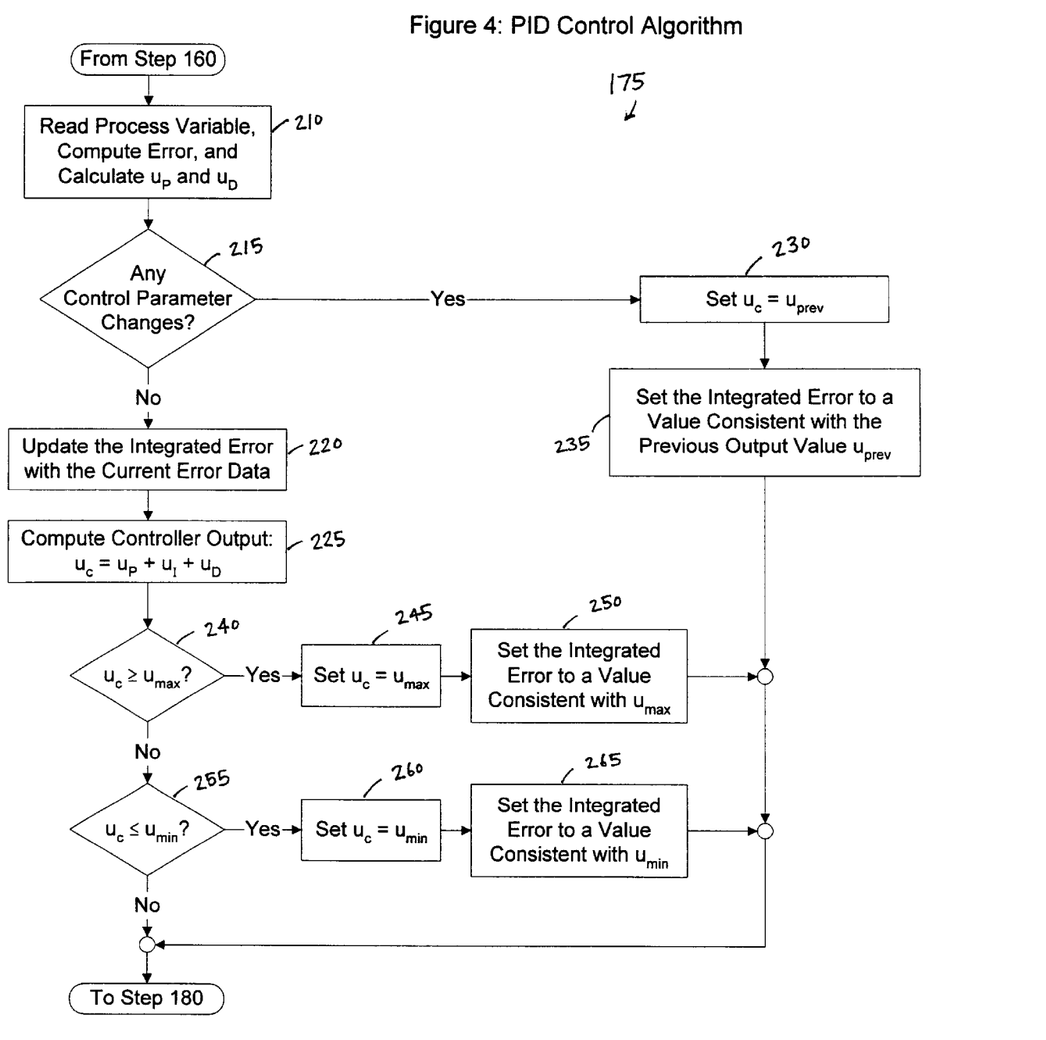
FIG. 4 illustrates a PID control algorithm according to the present invention.

FIG. 4—Invoke PID Controller (Step 175)

FIG. 4 is a flowchart of step 175. In step 210 the control algorithm (a) reads the current process value $PV_k$ from DAQ unit 120, (b) calculates the current error value according to the equation $$e_k = SP_k - PV_k,$$

where $SP_k$ is the current value of the set point, (c) calculates the proportional control term $u_P$ according to the relation $u_P = K_P \cdot e_k$, where $K_P$ is the proportional gain, and (d) calculates the derivative control term according to the relation $$u_D = K_P T_D \frac{e_k - e_{k-1}}{\Delta t}, \qquad (14)$$

where $T_D$ is the derivative gain, $\Delta t$ is the sample time, and $e_{k-1}$ is the previous error value, i.e. the value of the error signal at the previous sample time.

In step 215 the control algorithm determines if any of the controller parameters have changed since the last iteration of the flowchart of FIG. 3. It is noted that the control algorithm of FIG. 3 preferably includes a graphical user interface (not shown) which provides the system user with the ability to vary the set point and the controller parameters. The control parameters include the proportional gain $K_P$, the integral gain $K_I = K_P T_I$, the derivative gain $K_D = K_P T_D$, and the manual/automatic mode control MA. If any (i.e. one or more) of the gains have been changed, or the mode control parameter indicates a change from manual mode to automatic mode, step 230 is performed. If none of the control parameters have changed since the last iteration of FIG. 3, step 220 is performed. It is noted that the PID controller stores the previous values of the controller gains and the mode control parameter in order to compare against the corresponding current values.

In the case that one or more control parameters have changed, the current controller output $u_c(k)$ is set equal to the previous controller output $u_{prev}$ as shown in step 230. The previous controller output $u_{prev}$ is taken to be the previous manual control output $u_m(k-1)$ if a transition from manual mode to automatic has occurred since the last iteration of FIG. 3. Thus, the PID controller of FIG. 4 maintains continuity with the previous manual control signal. If the controller was in automatic mode in the previous iteration, the previous controller output $u_{prev}$ is taken to be the previous PID controller output $u_c(k-1)$. Thus, the PID controller generates a continuous control output $u_c$ even in the presence of changes in the gain parameters.

In step 235, the PID controller computes the value of the integrated error IE which satisfies the relation $$u_{prev}=u_c(k)=u_P+K_I\cdot IE+u_D. \qquad (15)$$

In other words, the integrated error is set to that value which guarantees consistency with the previous controller output:

$$IE = \frac{u_{prev} - u_P - u_D}{K_I}. \qquad (16)$$

By choosing this value for the integrated error, the PID controller guarantees the sustained continuity of the PID controller output $u_c$. Since the future values $u_P(k+\tau)$ and $u_D(k+\tau)$ of the proportional and derivative control terms are likely to be approximately equal to the corresponding current values $u_P(k)$ and $u_D(k)$ computed in step 210 (at least for small values of $\tau$), the corresponding future values of the PID controller output $u_c(k+\tau)$ are likely to be close to the current value $u_c(k)$ of the PID controller output. After step 235, control passes to step 180.

Figure 5A:
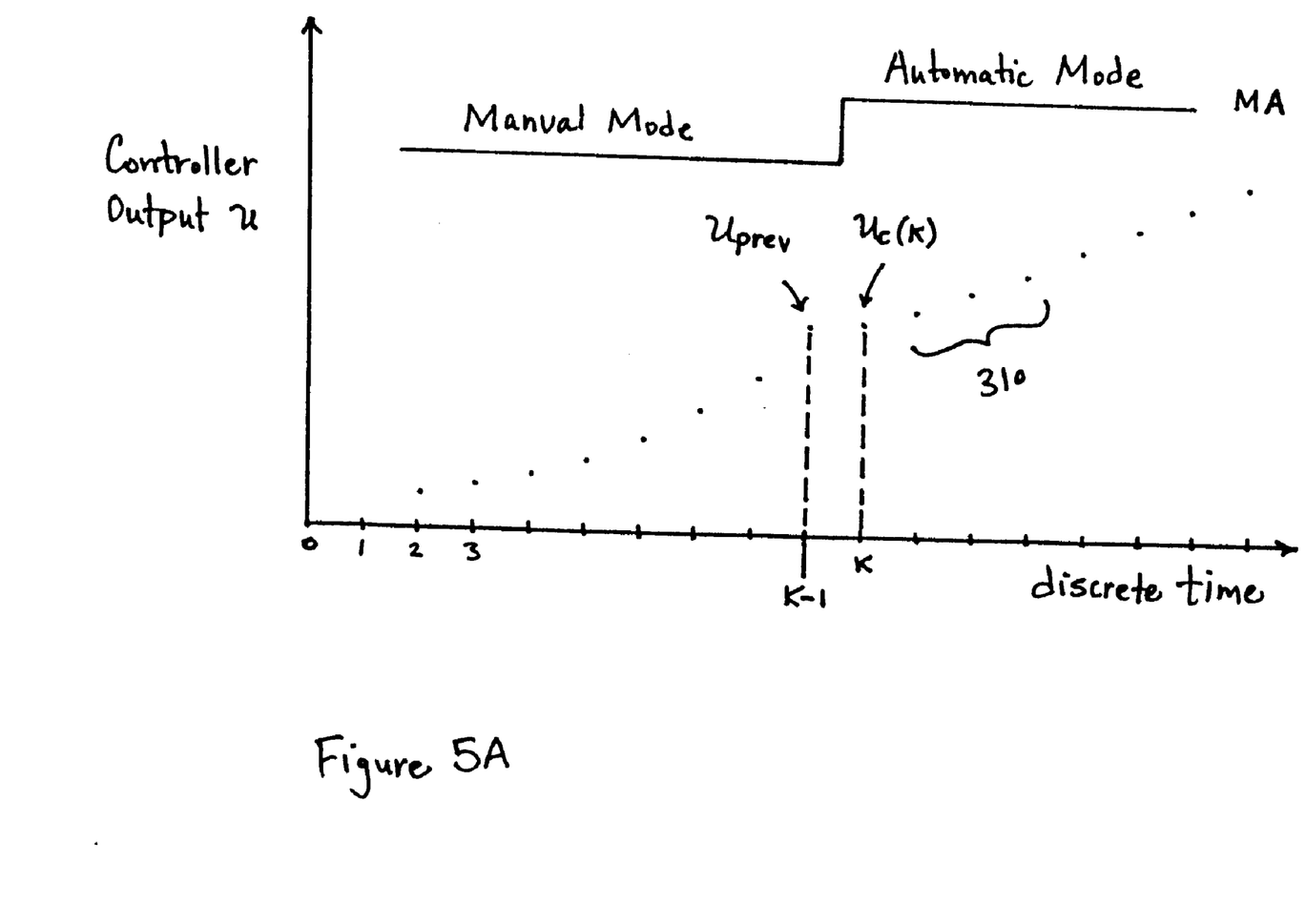
FIG. 5A depicts the output of the controller according to the present invention in response to a change in mode from manual to automatic.
Figure 5B:
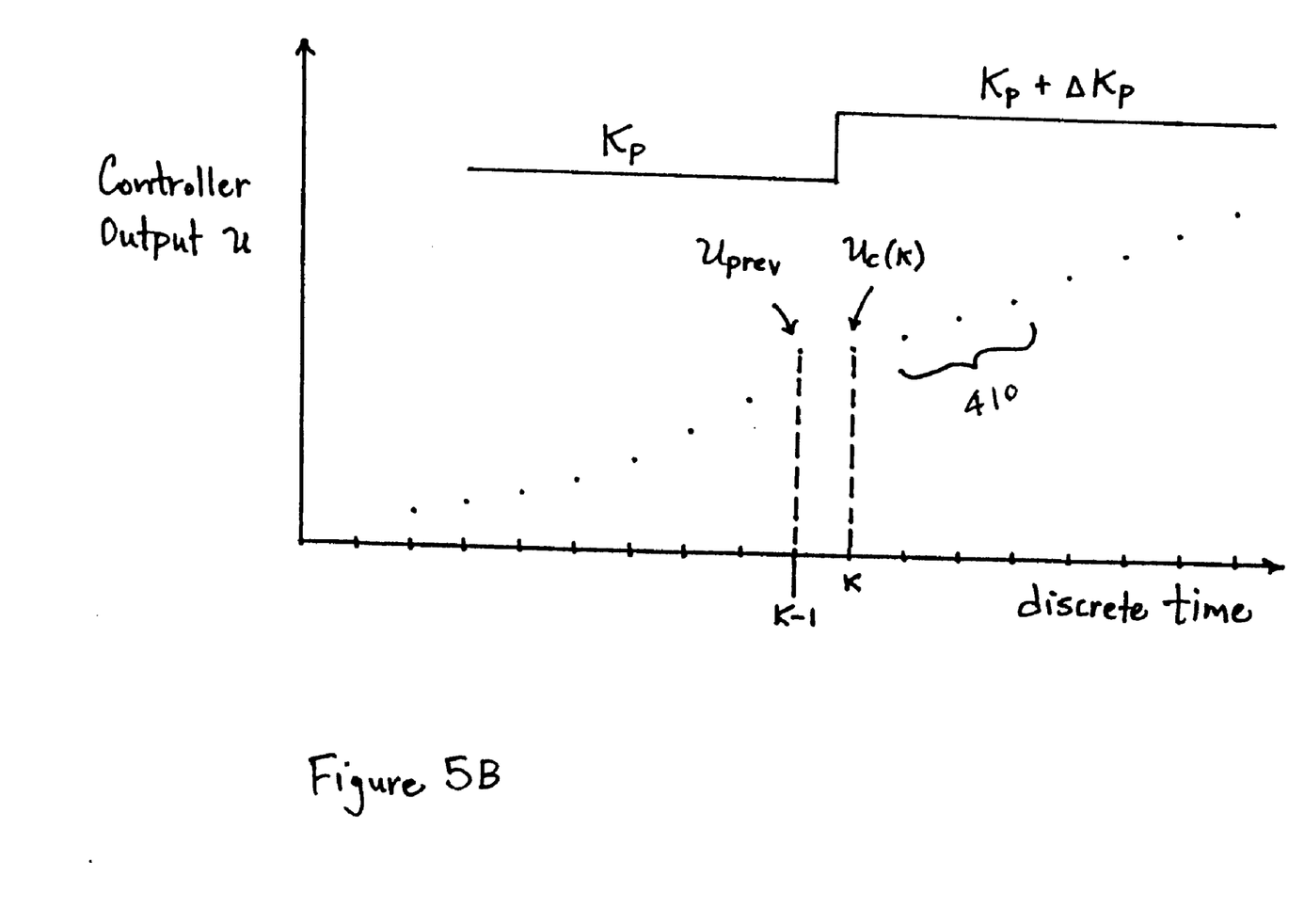
FIG. 5B depicts the output of the controller according to the present invention in response to a change in the proportional gain parameter.

FIGS. 5A and 5B—Controller Output

FIG. 5A illustrates the controller output u in response to a transition from manual mode to automatic mode. Values of the controller output u are graphed as a function of the discrete time index. A graph of the mode parameter MA is superimposed on the controller output graph to illustrate the time of the mode transition. In particular, a transition from manual mode to automatic mode is shown to occur in the time interval between the time index values k−1 and k. Thus, up to time index k−1, the controller output u takes the value of the manual control signal $u_m$ generated in step 165. After the transition to automatic mode, i.e. at time index k, the PID controller generates an output value $u_c(k)$ equal to the previous controller output $u_{prev}$, i.e. the previous manual control signal value $u_m(k-1)$. Thus, the PID controller maintains continuity at the time of the mode transition. In addition, the output of the PID controller for several samples 310 after the transition is likely to be close to the transition value $u_{prev}$ due to the value given to the integrated error at the transition time as discussed above.

FIG. 5B illustrates the controller output u in response to a change in the proportional gain $K_P$. The controller is assumed to be in automatic mode through the entire duration shown in FIG. 5B. Values of the controller output u are graphed as a function of the discrete time index. A graph of the proportional gain $K_P$ is superimposed on the controller output. A change in the proportional gain of magnitude $\Delta K_P$ is shown to occur in the time interval between the time indices k−1 and k. Thus, up to time index k−1, the PID controller generates the controller output u on the basis of the first proportional gain value $K_P$. After the gain change, i.e. at time index k, the PID controller generates an output value $u_c(k)$ equal to the previous controller output $u_{prev}$, i.e. the previous PID controller output value $u_c(k-1)$. Thus, the PID controller maintains continuity at the time of the gain change. In addition, the output of the PID controller for several samples 410 after the gain change is likely to be close to the transition value $u_{prev}$ due to the value given to the integrated error at the time of the gain change as discussed above. The comments above concerning the PID controller response to a change in proportional change apply equally to changes in any of the gain parameters.

In the case that none of the controller parameters have changed as determined in step 215, the PHD controller updates the integrated error IE with the current error data according to the relation $$IE_k = IE_{k-1} + \Delta t \cdot \frac{e_k + e_{k-1}}{2}, \qquad (17)$$

where $IE_k$ denotes the current integrated error, and $IE_{k-1}$ denotes the previous integrated error.

In step 225, the PID controller calculates the current controller output $u_c$ according to the relation $$u_c=u_P+u_I+u_D,$$

where $u_P$ and $u_D$ are the proportional and derivative control terms calculated in step 210, and $u_I$ is an integral control term computed according to the formula $u_I=K_I\cdot IE_k$, where $K_I$ is the integral gain.

In steps 240 through 265, a method for performing integrator anti-windup is disclosed. In step 240, the current control output $u_c$ is compare to an upper bound $u_{max}$. If the control output $u_c$ is greater than or equal to the upper bound $u_{max}$, steps 245 and 250 are performed. If the control output is less than the upper bound, step 255 is performed.

In the case that the control output is greater than or equal to the upper bound, the control output is assigned the value of the upper bound: $u_c=u_{max}$ as shown in step 245. In step 250, the current integrated error IE is set to a value consistent with the upper bound $u_{max}$ according to the PID controller equation $$u_{max}=u_c(k)=u_P K_I\cdot IE+u_D. \qquad (18)$$

In other words, the integrated error IE is assigned the value $$IE = \frac{u_{max} - u_P - u_D}{K_I}. \qquad (19)$$

It is noted that this choice for the integrated error prevents the integrated error from growing when a saturation condition is achieved, and thus efficiently implements an integrator anti-windup function of the PID controller. After step 250, control passes to step 180.

In the case that the current control output is determined to be less than the upper bound (in step 240), step 255 is performed. In step 255, the current control output $u_c$ is compared to a lower bound $u_{min}$. If the current control output $u_c$ is less than or equal to the lower bound $u_{min}$, steps 260 and 265 are performed. Otherwise, control passes to step 180.

In step 260, the current controller output is assigned the value of the lower bound $u_{min}$. In step 265, the current integrated error IE is set to a value consistent with the lower bound $u_{min}$ according to the PID controller equation $$u_{min}=u_c(k)=u_P+K_I \cdot IE+u_D. \quad (20)$$

In other words, the integrated error IE is assigned the value $$IE = \frac{u_{min} - u_P - u_D}{K_I}. \quad (21)$$

It is noted that this choice for the integrated error prevents the integrated error from descending when a saturation condition is achieved, and thus efficiently implements the integrator anti-windup function of the PID controller. After step 265, control passes to step 180.

In summary, it is observed that the PID control algorithm of FIG. 4 maintains continuity of the control output in spite of changes in controller parameters including a change in the mode parameter from manual to automatic mode. Namely, the control output at the time of a parameter change is set equal to the previous controller output, and the integrated error is set to a value consistent with the previous controller output according to the fundamental PID controller equation. This value for the integrated error serves to ensure the sustained continuity of the control output after the controller parameter change. Furthermore, the PID control algorithm of FIG. 4 employs integrator anti-windup. The formulas (19) and (21) used to set the integrated error during control saturation are advantageously similar to the formula (16) used to set the integrated error in response to controller parameter changes. This uniformity in computational form may allow the PID control algorithm of FIG. 3 to achieve a more efficient and compact code realization.

In the preferred embodiment, the flowcharts of FIGS. 3 and 4 are realized in software. The software algorithm is stored on any of a variety of memory media as described above.

In addition, the flowchart of FIGS. 3 and 4 may be implemented in dedicated hardware. For example, the processing steps in the flowcharts of FIGS. 3 and 4 may be realized by a network of analog and/or digital devices such as adders, comparators, multipliers, etc. Thus, the methods of the present invention are not limited to embodiments in software.

It is noted that the methods of the present invention are especially beneficial when applied to gain scheduling PID controllers. As described in above, gain scheduling PID assign different sets of gains parameters values to different regions of a selected variable such as the set point (or process variable). Thus, according to the present invention, continuity of the controller output is advantageously preserved even when the gains change from one set to another due to migration of the selected variable from one region to another.

Figure 6:
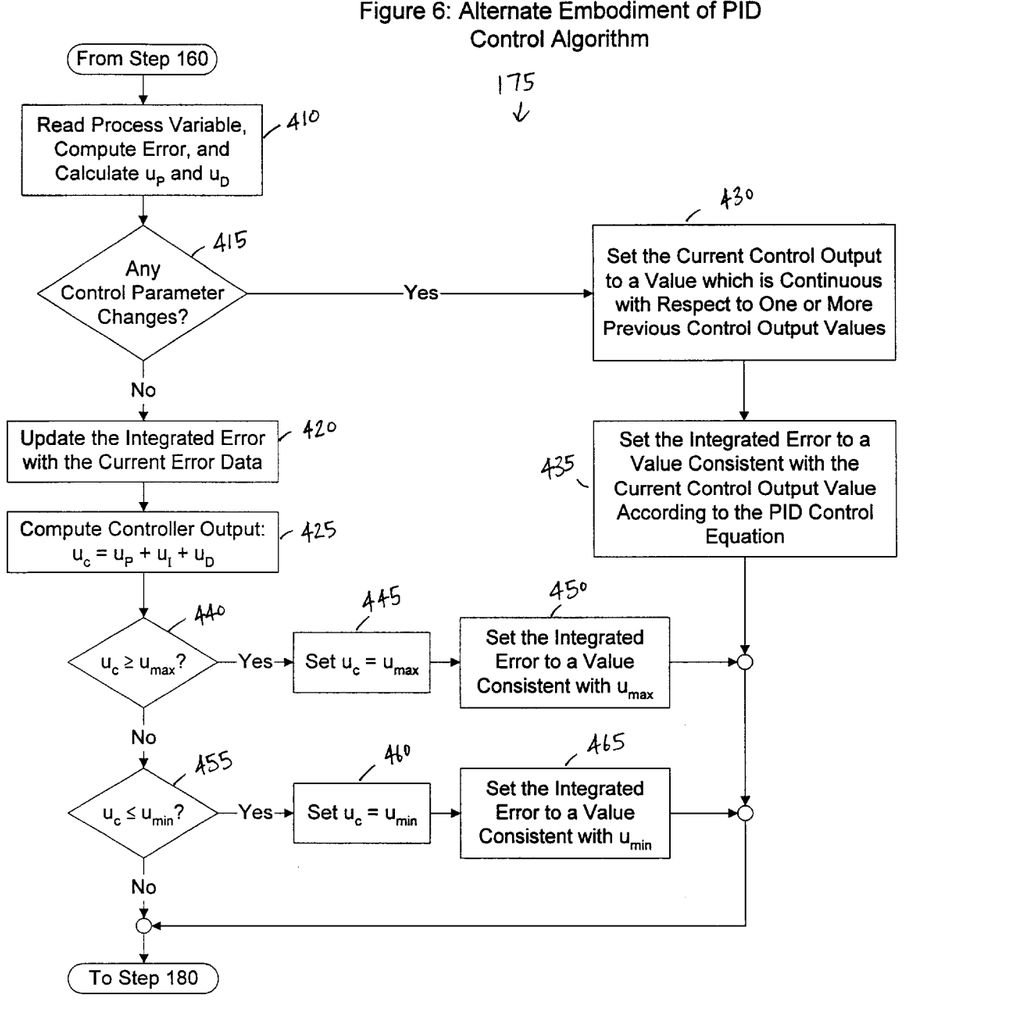
FIG. 6 illustrates an alternative embodiment of the PID control algorithm according to the present invention.

FIG. 6—Invoke PID Controller (Step 175): Alternate Embodiment

FIG. 6 is a flowchart which illustrates an alternate embodiment of step 175 of FIG. 3. In step 410 the control algorithm (a) reads the current process value $PV_k$ from DAQ unit 120, (b) calculates the current error value according to the equation $$e_k=SP_k-PV_k,$$

where $SP_k$ is the current value of the set point, (c) calculates the proportional control term $u_P$ according to the relation $u_P=K_P \cdot e_k$, where $K_P$ is the proportional gain, and (d) calculates the derivative control term according to the relation $$u_D = K_P T_D \frac{e_k - e_{k-1}}{\Delta t},$$

where $T_D$ is the derivative gain, $\Delta t$ is the sample time, and $e_{k-1}$ is the previous error value, i.e. the value of the error signal at the previous sample time.

In step 415 the control algorithm determines if any of the controller parameters have changed since the last iteration of the flowchart of FIG. 3. The control parameters include the proportional gain $K_P$, the integral gain $K_I=K_P/T_I$, the derivative gain $K_D=K_P T_D$, and the manual/automatic mode control MA. If any (i.e. one or more) of the gains have been changed, or the mode control parameter indicates a change from manual mode to automatic mode, step 430 is performed. If none of the control parameters have changed since the last iteration of FIG. 3, step 420 is performed. It is noted that the PID controller stores the previous values of the controller gains and the mode control parameter in order to compare against the corresponding current values.

In the case that one or more control parameters have changed, the current controller output $u_c(k)$ is set equal to a value which is continuous with respect to one or more previous control output values as shown in step 430. In one embodiment of step 430, the PID control algorithm calculates the current control output by performing a linear extrapolation based on a plurality of previous control output values. For example, the current control output may be extrapolated linearly based on the two previous control output values according to the relation $$u_c(k)=2u_c(k-1)-u_c(k-2). \quad (22)$$

More generally, it is observed that a linear extrapolation may be performed based on two or more previous control output values by computing an linear combination of the two or more previous control output values using appropriately chosen coefficients. Linear extrapolation advantageously provides continuity of control output signal and its first derivative (or the first difference) in spite of control parameter transitions.

In a second embodiment of step 430, a non-linear scheme of calculating the current control output value based on previous control output values is utilized. For example, the current control output value may be computed by performing a polynomial extrapolation. It is noted that to perform an $N^{th}$ degree polynomial extrapolation generally requires to use of (N+1) previous control output values to determine the (N+1) coefficients of an $N^{th}$ degree interpolating polynomial. Non-linear schemes for calculating the current control output value may advantageously provide higher order continuity for the current control output value at the time of a parameter transition. In other words, the current control output may advantageously exhibit continuity up through a predefined number of derivatives through a change in one or more of the control parameters.

It is noted that the previous control output values will be manual control output values (generated in step 165 of FIG. 3) if a transition from manual mode to automatic has occurred since the last iteration of FIG. 3. Alternatively, if a change in one of the controller parameters other than the mode parameter has occurred since the last iteration of FIG. 3, the previous control output values will be the previous output values generated under automatic control, i.e. generated in step 175 of FIG. 3.

In step 435 the PID controller computes the value of the integrated error IE so as to be consistent with the current control output value computed in step 430 according to the PID control equation. In other words, the integrated error is set to a value determined by the equation $$IE = \frac{u_c(k) - u_P - u_D}{K_I}, \quad (23)$$

where IE denotes the integrated error, and $u_c(k)$ denotes the current control output value computed in step 430. By choosing this value for the integrated error, the PID controller guarantees the sustained continuity of the PID controller output $u_c$ for subsequent iterations of the PID control algorithm.

In a third embodiment of step 430, the current control output $u_c(k)$ is computed from the positional equation (4) based on the "old" controller parameter values, i.e. the controller parameter values prior to the change detected in step 415. According to the third embodiment, the integrated error is computed from the same positional equation (4) using the current control output $u_c(k)$ just calculated and the new controller parameters. Thus, the integrated error IE is given by $$IE = \frac{1}{K'_I}\left[u_c(k) - K'_P e_k - K'_P T'_D \frac{e_k - e_{k-1}}{\Delta t}\right],$$

where $K'_P$, $K'_I$, and $T'_D$ denote the new proportional gain, the new integral gain, and the new derivative time-constant respectively. In this fashion, current control output is given a value which is continuous with past output values, and the integrated error is assigned a value which will ensure the continuity of the control output in the future, i.e. after the control parameter transition.

In the case that none of the controller parameters have changed as determined in step 415, the PID controller updates the integrated error IE with the current error data according to the relation $$IE_k = IE_{k-1} + \Delta t \cdot \frac{e_k + e_{k-1}}{2},$$

where $IE_k$ denotes the current integrated error, and $IE_{k-1}$ denotes the previous integrated error.

In step 425 the PID controller calculates the current controller output $u_c$ according to the relation $$u_c = u_P + u_I + u_D,$$

where $u_P$ and $u_D$ are the proportional and derivative control terms calculated in step 410, and $u_I$ is an integral control term computed according to the formula $u_I = K_I \cdot IE_k$, where $K_I$ is the integral gain.

In steps 440 through 465, a method for performing integrator anti-windup is disclosed. In step 440, the current control output $u_c$ is compare to an upper bound $u_{max}$. If the control output $u_c$ is greater than or equal to the upper bound $u_{max}$, steps 445 and 450 are performed. If the control output is less than the upper bound, step 455 is performed.

In the case that the control output is greater than or equal to the upper bound, the control output is assigned the value of the upper bound: $u_c = u_{max}$ as shown in step 445. In step 450, the current integrated error IE is set to a value consistent with the upper bound umax according to the PID controller equation $$u_{max} = u_c(k) = u_P + K_I \cdot IE + u_D. \quad (24)$$

In other words, the integrated error IE is assigned the value $$IE = \frac{u_{max} - u_P - u_D}{K_I}. \quad (25)$$

It is noted that this choice for the integrated error prevents the integrated error from growing when a saturation condition is achieved, and thus efficiently implements an integrator anti-windup function of the PID controller. After step 450, control passes to step 180.

In the case that the current control output is determined to be less than the upper bound (in step 440), step 455 is performed. In step 455, the current control output $u_c$ is compared to a lower bound $u_{min}$. If the current control output $u_c$ is less than or equal to the lower bound $u_{min}$, steps 460 and 465 are performed. Otherwise, control passes to step 180.

In step 460, the current controller output is assigned the value of the lower bound $u_{min}$. In step 465, the current integrated error IE is set to a value consistent with the lower bound $u_{min}$ according to the PID controller equation $$u_{min} = u_c(k) = u_P + K_I \cdot IE + u_D. \quad (26)$$

In other words, the integrated error IE is assigned the value $$IE = \frac{u_{min} - u_P - u_D}{K_I}. \quad (27)$$

It is noted that this choice for the integrated error prevents the integrated error from descending when a saturation condition is achieved, and thus efficiently implements the integrator anti-windup function of the PID controller. After step 465, control passes to step 180.

In summary, it is observed that the PID control algorithm of FIG. 6 maintains continuity of the control output and/or one or more derivatives of the control output in spite of changes in controller parameters including a change in the mode parameter from manual to automatic mode. Namely, the control output at the time of a parameter change is set to a value which is continuous with respect to one or more previous control output values. Furthermore, the integrated error is set to a value which is consistent with the current controller output just calculated. This value for the integrated error serves to ensure the sustained continuity of the control output after the controller parameter change. Furthermore, the PID control algorithm of FIG. 6 employs integrator anti-windup. The formulas (25) and (27) used to set the integrated error during control saturation are advantageously similar to the formula (23) used to set the integrated error in response to controller parameter changes. This uniformity in computational form may allow the PID control algorithm of FIG. 6 to achieve a more efficient and compact code realization In one embodiment, the flowcharts of FIGS. 3 and 6 are realized in software. The software may be stored on any of a variety of memory media as described above.

In addition, the flowchart of FIGS. 3 and 6 may be implemented in dedicated hardware. For example, the processing steps in the flowcharts of FIGS. 3 and 6 may be realized by a network of analog and/or digital devices such as adders, comparators, multipliers, etc. Thus, the methods of the present invention are not limited to embodiments in software.

Although the system and method of the present invention has been described in connection with specific embodiments, it is not intended to be limited to the specific forms set forth herein, but on the contrary, it is intended to cover such alternatives, modifications, and equivalents, as can be reasonably included within the spirit and scope of the invention as defined by the appended claims.

What is claimed is:

1. A method for performing PID control of a process, the method comprising:
   receiving a process variable indicative of a state of the process;
   generating a current control output value in response to receiving the process variable, wherein the current control output value is applied to the process to control the process;
   wherein said generating the current control output value includes:
      determining whether a control parameter change has occurred since a last control iteration;
      calculating the current control output value according to a positional PID algorithm in response to determining that a control parameter change has not occurred since the last control iteration;
      setting the current control output value equal to a previous control output value, and setting an integrated error to a value consistent with said previous control output value in accordance with a PID control equation, in response to determining that a control parameter change has occurred since the last control iteration.

2. The method of claim 1, wherein said determining whether a control parameter change has occurred since the last control iteration comprises determining if one or more of a proportional gain, an integral gain, and a derivative gain have changed since the last control iteration;
   wherein said setting the integrated error to a value consistent with the previous control output value comprises equating the integrated error to a value determined by the relation $$IE = \frac{u_{prev} - u_P - u_D}{K_I},$$

where IE signifies the integrated error, $u_{prev}$ signifies the previous control output value, $u_P$ signifies a proportional control term, $u_D$ signifies a derivative control term, and $K_I$ signifies the integral gain.

3. The method of claim 1, wherein said determining whether a control parameter change has occurred since the last control iteration comprises determining if a mode parameter has changed so as to indicate a change from a manual control mode to an automatic control mode;
   wherein said setting the control output value equal to the previous control output value comprises setting the control output value equal to a previous manual control output value.

4. The method of claim 3, wherein said setting the integrated error to a value consistent with the previous control output value comprises equating the integrated error to a value determined by the relation $$IE = \frac{u_{man} - u_P - u_D}{K_I},$$

where IE signifies the integrated error, $u_{man}$ signifies the previous manual control output value, $u_P$ signifies a proportional control term, $u_D$ signifies a derivative control term, and $K_I$ signifies an integral gain.

5. The method of claim 1, further comprising:
   determining if the current control output value is greater than or equal to an upper control bound in response to said calculating the current control output value according to a positional PID algorithm;
   setting the current control output value equal to the upper control bound, and setting the integrated error to a value consistent with the upper control bound in accordance with the PID control equation, in response to determining that the current control output is greater than or equal to the upper control bound.

6. The method of claim 5, wherein said setting of the integrated error to a value consistent with the upper control bound comprises equating the integrated error to a value determined by the relation $$IE = \frac{u_{upper} - u_P - u_D}{K_I},$$

where IE signifies the integrated error, $u_{upper}$ signifies the upper control bound, $u_P$ signifies a proportional control term, $u_D$ signifies a derivative control term, and $K_I$ signifies an integral gain.

7. The method of claim 1, further comprising:
   determining if the current control output value is less than or equal to a lower control bound in response to said calculating the current control output value according to a positional PID algorithm;
   setting the current control output value equal to the lower control bound, and setting the integrated error to a value consistent with the lower control bound in accordance with the PID control equation, in response to determining that the current control output is less than or equal to the lower control bound.

8. The method of claim 7, wherein said setting of the integrated error to a value consistent with the lower control bound comprises equating the integrated error to a value determined by the relation $$IE = \frac{u_{lower} - u_P - u_D}{K_I},$$

where IE signifies the integrated error, $u_{lower}$ signifies the lower control bound, $u_P$ signifies a proportional control term, $u_D$ signifies a derivative control term, and $K_I$ signifies an integral gain.

9. A system for implementing a PID controller, the system comprising:
   a processor;
   a memory unit coupled to the processor;
   an actuator coupled to the processor, wherein the actuator is operable to connect to a process;
   wherein the processor is configured to execute a software control algorithm stored in the memory unit;
   wherein, under the control of said software control algorithm, the processor is operable to receive a process variable indicative of a state of the process and generate a current control output value in response to the process variable, wherein the current control output value is applied to the process to control the process;
   wherein, in generating the current control output value, the processor is operable (a) to determine whether a control parameter change has occurred since a last iteration of said software control algorithm, (b) to calculate the current control output value according to a positional PID algorithm in response to determining that a control parameter change has not occurred since the last iteration, (c) to set the current control output value equal to a previous control output value and to set an integrated error to a value consistent with the previous control output value in accordance with a PID control equation, in response to determining that a control parameter change has occurred since the last iteration.

10. The system of claim 9, further comprising:
a digital-to-analog converter coupled between the processor and the actuator;
wherein said digital-to-analog converter is configured to convert the current control output value to an analog control signal;
wherein said analog control signal directs said actuator to apply a corresponding input to said process.

11. A method for performing PID control of a process, the method comprising:
receiving a process variable indicative of a state of the process;
generating a current control output value in response to receiving the process variable, wherein the current control output value is applied to the process to control the process;
wherein said generating the current control output value includes:
determining whether a control parameter change has occurred since a last control iteration;
calculating the current control output value according to a positional PID algorithm in response to determining that a control parameter change has not occurred since the last control iteration;
calculating a first value which is continuous with respect to one or more previous control output values, and setting the current control output value equal to the first value, in response to determining that a control parameter change has occurred since the last control iteration.

12. The method of claim 11 wherein said calculating the first value comprises performing a linear extrapolation of said first value based on a plurality of said previous control output values.

13. The method of claim 11 wherein said calculating the first value comprises performing an $N^{th}$ degree polynomial extrapolation of said first value based on a plurality of previous control output values, wherein N is an integer greater than or equal to one.

14. The method of claim 11 wherein said calculating the first value comprises computing an output value from a positional PID control equation using control parameter values in force prior to said control parameter change.

15. The method of claim 11 further comprising setting an integrated error to a value consistent with said first value in accordance with a PID control equation.

16. The method of claim 15, wherein said setting the integrated error to a value consistent with the first value comprises equating the integrated error to a value determined by the relation $$IE = \frac{u_{first} - u_P - u_D}{K_I},$$

where IE signifies the integrated error, $u_{first}$ signifies the first value, $u_P$ signifies a proportional control term, $u_D$ signifies a derivative control term, and $K_I$ signifies the integral gain.

17. The method of claim 15, wherein said determining whether a control parameter change has occurred since the last control iteration comprises determining if one or more of a proportional gain, an integral gain, and a derivative gain have changed since the last control iteration.

18. The method of claim 15, wherein said determining whether a control parameter change has occurred since the last control iteration comprises determining if a mode parameter has changed so as to indicate a transition from a manual control mode to an automatic control mode;
wherein said one or more previous control output values comprise one or more previous manual control output values, and wherein said first value is calculated based on said one or more previous manual control output values.

19. The method of claim 15, further comprising:
determining if the current control output value is greater than or equal to an upper control bound in response to said calculating the current control output value according to a positional PID algorithm;
setting the current control output value equal to the upper control bound, and setting the integrated error to a value consistent with the upper control bound in accordance with the PID control equation, in response to determining that the current control output is greater than or equal to the upper control bound.

20. The method of claim 19, wherein said setting of the integrated error to a value consistent with the upper control bound comprises equating the integrated error to a value determined by the relation $$IE = \frac{u_{upper} - u_P - u_D}{K_I},$$

where IE signifies the integrated error, $u_{upper}$ signifies the upper control bound, $u_P$ signifies a proportional control term, $u_D$ signifies a derivative control term, and $K_I$ signifies an integral gain.

21. The method of claim 15, further comprising:
determining if the current control output value is less than or equal to a lower control bound in response to said calculating the current control output value according to a positional PID algorithm;
setting the current control output value equal to the lower control bound, and setting the integrated error to a value consistent with the lower control bound in accordance with the PID control equation, in response to determining that the current control output is less than or equal to the lower control bound.

22. The method of claim 21, wherein said setting of the integrated error to a value consistent with the lower control bound comprises equating the integrated error to a value determined by the relation $$IE = \frac{u_{lower} - u_P - u_D}{K_I},$$

where IE signifies the integrated error, $u_{lower}$ signifies the lower control bound, $u_P$ signifies a proportional control term, $u_D$ signifies a derivative control term, and $K_I$ signifies an integral gain.

23. A PID control system comprising:
a PID controller;
an actuator coupled to the PID controller, wherein the actuator is operable to connect to a process;

wherein the PID controller is operable to receive a process variable indicative of a state of the process and generate a current control output value in response to the process variable, wherein the current control output value is applied to the process to control the process;

wherein, in generating the current control output value, the PID controller is operable (a) to determine whether a control parameter change has occurred since a last control iteration, (b) to calculate the current control output value according to a positional PID algorithm in response to determining that a control parameter change has not occurred since the last iteration, and (c) to calculate a first value which is continuous with respect to one or more previous control output values and to set the current control output value equal to the first value, in response to determining that a control parameter change has occurred since the last control iteration.

24. The system of claim 23, wherein the PID controller comprises a processor which executes a software program stored in a memory.

25. The system of claim 24, wherein said processor, operating under the control of said software program, is configured to calculate the first value by performing a linear extrapolation of said first value based on a plurality of said previous control output values.

26. The system of claim 24, wherein said processor, operating under the control of said software program, is configured to calculate the first value by performing an $N^{th}$ degree polynomial extrapolation of said first value based on a plurality of said previous control output values, wherein N is an integer greater than or equal to one.

27. The system of claim 24 wherein said processor, operating under the control of said software program, is configured to calculate the first value by computing an output value from a positional PID control equation using control parameter values in force prior to said control parameter change.

28. The system of claim 24, wherein said processor, operating under the control of said software program, is configured to set an integrated error to a value consistent with the first value in accordance with a PID control equation.

29. The system of claim 28, wherein said processor, operating under the control of said software program, is configured to set the integrated error to a value determined by the relation $$IE = \frac{u_{first} - u_P - u_D}{K_I},$$

where IE signifies the integrated error, $u_{first}$ signifies the first value, $u_P$ signifies a proportional control term, $u_D$ signifies a derivative control term, and $K_I$ signifies the integral gain.

30. The system of claim 24, wherein said processor, operating under the control of the software program, is configured to determine whether a control parameter change has occurred since the last control iteration by determining if one or more of a proportional gain, an integral gain, and a derivative gain have changed since the last control iteration.

31. The system of claim 24, wherein said processor, operating under the control of the software program, is configured to determine whether a control parameter change has occurred since the last control iteration by determining if a mode parameter has changed so as to indicate a transition from a manual control mode to an automatic control mode;

wherein said one or more previous control output values comprise one or more previous manual control output values, and wherein said first value is calculated based on said one or more previous manual control output values.

32. The system of claim 24, wherein said processor, operating under the control of the software program, is operable to determine if the current control output value is greater than or equal to an upper control bound in response to said calculation of the current control output value according to the positional PID algorithm;

wherein said processor is operable to set the current control output value equal to the upper control bound, and to set the integrated error to a value consistent with the upper control bound in accordance with the PID control equation, in response to determining that the current control output is greater than or equal to the upper control bound.

33. The system of claim 32, wherein said processor is operable to perform said setting of the integrated error to a value consistent with the upper control bound by equating the integrated error to a value determined by the relation $$IE = \frac{u_{upper} - u_P - u_D}{K_I},$$

where IE signifies the integrated error, $u_{upper}$ signifies the upper control bound, $u_P$ signifies a proportional control term, $u_D$ signifies a derivative control term, and $K_I$ signifies an integral gain coefficient.

34. The system of claim 24, wherein said processor, operating under the control of the software program, is configured to determine if the current control output value is less than or equal to a lower control bound in response to said calculation of the current control output value according to the positional PID algorithm;

wherein said processor is operable to set the current control output value equal to the lower control bound, and to set the integrated error to a value consistent with the lower control bound in accordance with the PID control equation, in response to determining that the current control output is less than or equal to the lower control bound.

35. The system of claim 34, wherein said processor is operable to perform said setting of the integrated error to a value consistent with the lower control bound by equating the integrated error to a value determined by the relation $$IE = \frac{u_{lower} - u_P - u_D}{K_I},$$

where IE signifies the integrated error, $u_{lower}$ signifies the lower control bound, $u_P$ signifies a proportional control term, $u_D$ signifies a derivative control term, and $K_I$ signifies an integral gain.

36. A memory media which stores program instructions for performing PID control of a process, wherein the PID control of the process includes receiving a process variable indicative of a state of the process and generating a current control output value in response to receiving the process variable, wherein the current control output value is applied to the process to control the process;

wherein, in generating the current control output, the program instructions are executable to implement:
  determining whether a control parameter change has occurred since a last control iteration;

calculating the current control output value according to a positional PID algorithm in response to determining that a control parameter change has not occurred since the last control iteration;

setting the current control output value equal to a previous control output value, and setting an integrated error to a value consistent with said previous control output value in accordance with a PID control equation, in response to determining that a control parameter change has occurred since the last control iteration.

37. The memory media of claim 36, wherein the program instructions are further executable to implement:

said determining whether a control parameter change has occurred since the last control iteration comprises determining if one or more of a proportional gain, an integral gain, and a derivative gain have changed since the last control iteration;

wherein said setting the integrated error to a value consistent with the previous control output value comprises equating the integrated error to a value determined by the relation $$IE = \frac{u_{prev} - u_P - u_D}{K_I},$$

where IE signifies the integrated error, $u_{prev}$ signifies the previous control output value, $u_P$ signifies a proportional control term, $u_D$ signifies a derivative control term, and $K_I$ signifies the integral gain.

38. The memory media of claim 36, wherein the program instructions are further executable to implement:

said determining whether a control parameter change has occurred since the last control iteration comprises determining if a mode parameter has changed so as to indicate a change from a manual control mode to an automatic control mode;

wherein said setting the control output value equal to the previous control output value comprises setting the control output value equal to a previous manual control output value.

39. The memory media of claim 38, wherein the program instructions are further executable to implement:

said setting the integrated error to a value consistent with the previous control output value comprises equating the integrated error to a value determined by the relation $$IE = \frac{u_{man} - u_P - u_D}{K_I},$$

where IE signifies the integrated error, $u_{man}$ signifies the previous manual control output value, $u_P$ signifies a proportional control term, $u_D$ signifies a derivative control term, and $K_I$ signifies an integral gain.

40. The memory media of claim 36, wherein the program instructions are further executable to implement:

determining if the current control output value is greater than or equal to an upper control bound in response to said calculating the current control output value according to a positional PID algorithm;

setting the current control output value equal to the upper control bound, and setting the integrated error to a value consistent with the upper control bound in accordance with the PID control equation, in response to determining that the current control output is greater than or equal to the upper control bound.

41. The memory media of claim 40, wherein said setting of the integrated error to a value consistent with the upper control bound comprises equating the integrated error to a value determined by the relation $$IE = \frac{u_{upper} - u_P - u_D}{K_I},$$

where IE signifies the integrated error, $u_{upper}$ signifies the upper control bound, $u_P$ signifies a proportional control term, $u_D$ signifies a derivative control term, and $K_I$ signifies an integral gain.

42. The memory media of claim 36, wherein the program instructions are further executable to implement:

determining if the current control output value is less than or equal to a lower control bound in response to said calculating the current control output value according to a positional PID algorithm;

setting the current control output value equal to the lower control bound, and setting the integrated error to a value consistent with the lower control bound in accordance with the PID control equation, in response to determining that the current control output is less than or equal to the lower control bound.

43. The memory media of claim 42, wherein said setting of the integrated error to a value consistent with the lower control bound comprises equating the integrated error to a value determined by the relation $$IE = \frac{u_{lower} - u_P - u_D}{K_I},$$

where IE signifies the integrated error, $u_{lower}$ signifies the lower control bound, $u_P$ signifies a proportional control term, $u_D$ signifies a derivative control term, and $K_I$ signifies an integral gain.

44. A memory media which stores program instructions for performing PID control of a process, wherein the program instructions are executable to implement:

receiving a process variable indicative of a state of the process;

generating a current control output value in response to receiving the process variable, wherein the current control output value is applied to the process to control the process;

wherein said generating the current control output value includes:

determining whether a control parameter change has occurred since a last control iteration;

calculating the current control output value according to a positional PID algorithm in response to determining that a control parameter change has not occurred since the last control iteration;

calculating a first value which is continuous with respect to one or more previous control output values, and setting the current control output value equal to the first value, in response to determining that a control parameter change has occurred since the last control iteration.

45. The memory media of claim 44, wherein said calculating the first value comprises linearly extrapolating said first value from said one or more previous control output values.

46. The memory media of claim 44 wherein said calculating the first value comprises extrapolating said first value from said one or more previous control output value based on an $N^{th}$ order polynomial.

47. The memory media of claim 44 wherein said calculating the first value comprises computing an output value from a positional PID control equation using control parameter values in force prior to said control parameter change.

48. The memory media of claim 44, wherein the program instructions are further executable to set an integrated error to a value consistent with said first value in accordance with a PID control equation.

49. The memory media of claim 48, wherein said setting the integrated error to a value consistent with the first value comprises equating the integrated error to a value determined by the relation $$IE = \frac{u_{first} - u_P - u_D}{K_I},$$

where IE signifies the integrated error, $u_{first}$ signifies the first value, $u_P$ signifies a proportional control term, $u_D$ signifies a derivative control term, and $K_I$ signifies the integral gain.

50. The memory media of claim 48, wherein said determining whether a control parameter change has occurred since the last control iteration comprises determining if one or more of a proportional gain, an integral gain, and a derivative gain have changed since the last control iteration.

51. The memory media of claim 48, wherein said determining whether a control parameter change has occurred since the last control iteration comprises determining if a mode parameter has changed so as to indicate a transition from a manual control mode to an automatic control mode; wherein said one or more previous control output values comprise one or more previous manual control output values, and wherein said first value is calculated based on said one or more previous manual control output values.

52. The memory media of claim 48, wherein the program instructions are further executable to implement:

determining if the current control output value is greater than or equal to an upper control bound in response to said calculating the current control output value according to a positional PID algorithm;

setting the current control output value equal to the upper control bound, and setting the integrated error to a value consistent with the upper control bound in accordance with the PID control equation, in response to determining that the current control output is greater than or equal to the upper control bound.

53. The memory media of claim 52, wherein said setting of the integrated error to a value consistent with the upper control bound comprises equating the integrated error to a value determined by the relation $$IE = \frac{u_{upper} - u_P - u_D}{K_I},$$

where IE signifies the integrated error, $u_{upper}$ signifies the upper control bound, $u_P$ signifies a proportional control term, $u_D$ signifies a derivative control term, and $K_I$ signifies an integral gain.

54. The memory media of claim 48, wherein the program instructions are further executable to implement:

determining if the current control output value is less than or equal to a lower control bound in response to said calculating the current control output value according to a positional PID algorithm;

setting the current control output value equal to the lower control bound, and setting the integrated error to a value consistent with the lower control bound in accordance with the PID control equation, in response to determining that the current control output is less than or equal to the lower control bound.

* * * * *